J. VOLLMAN.
RESILIENT WHEEL.
APPLICATION FILED DEC. 3, 1910.
1,011,679.
Patented Dec. 12, 1911.
2 SHEETS—SHEET 1.
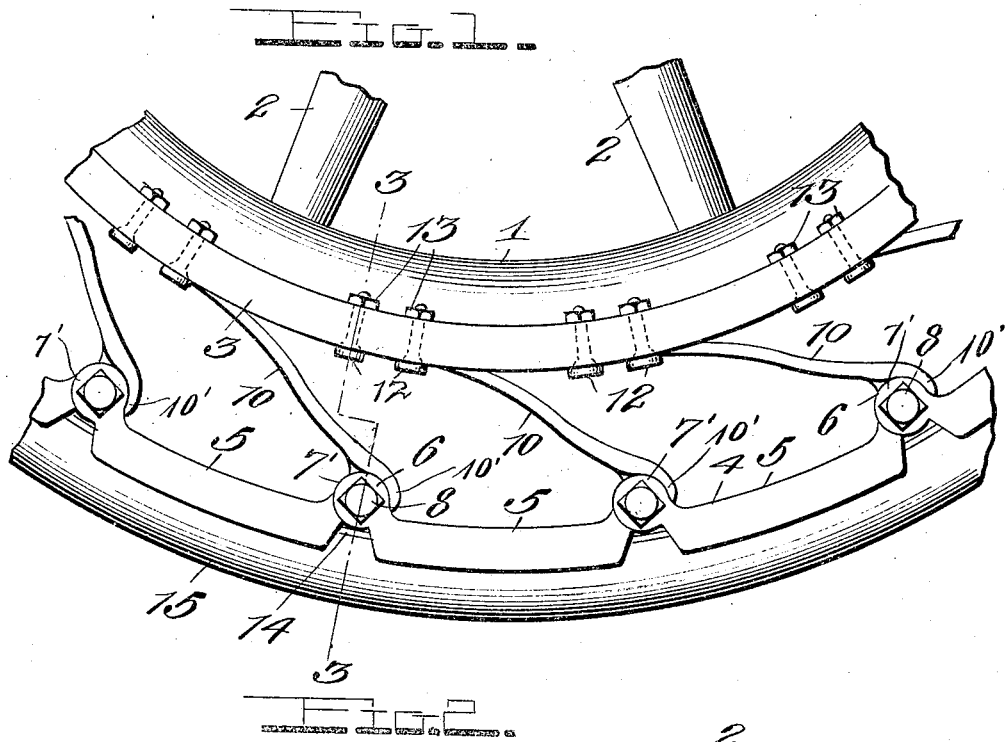
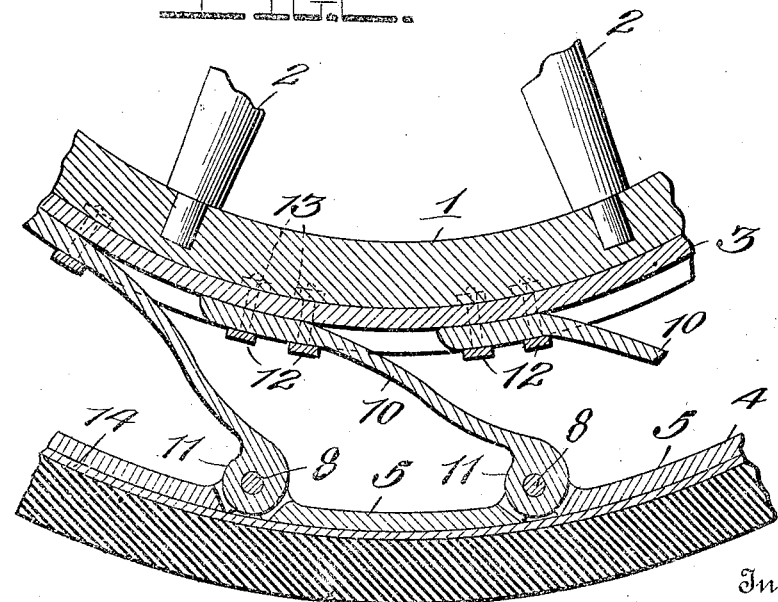
Witnesses
Inventor
J. Vollman,
Attorneys

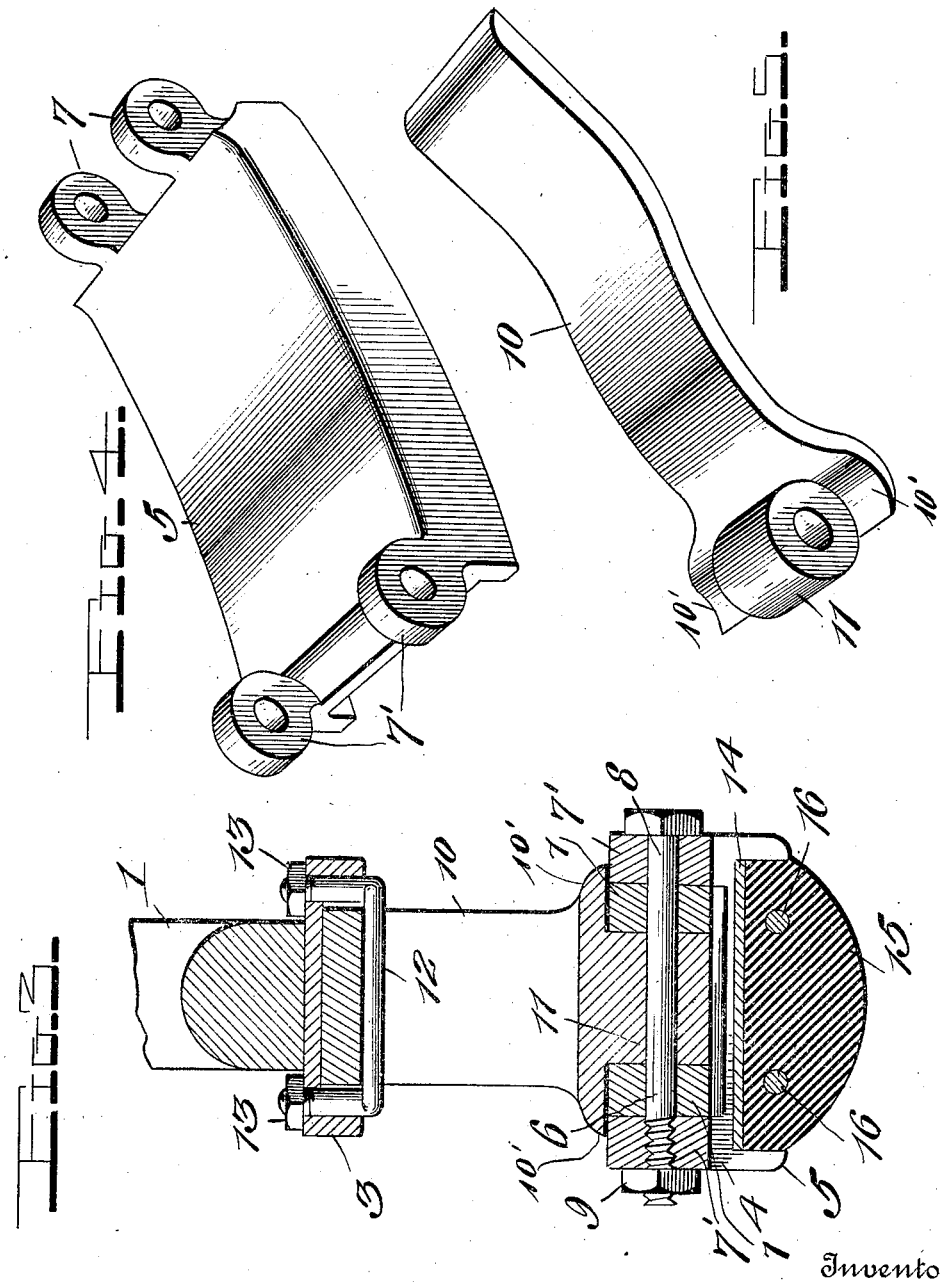

UNITED STATES PATENT OFFICE.

JOHN VOLLMAN, OF RACINE, WISCONSIN, ASSIGNOR OF ONE-THIRD TO PETER DE VOGEL, OF RACINE, WISCONSIN.

RESILIENT WHEEL.

1,011,679.　　　　Specification of Letters Patent.　　Patented Dec. 12, 1911.

Application filed December 3, 1910.　Serial No. 595,455.

*To all whom it may concern:*

Be it known that I, JOHN VOLLMAN, a citizen of the United States, residing at Racine, in the county of Racine and State of Wisconsin, have invented certain new and useful Improvements in Resilient Wheels; and I do declare the following to be a full, clear, and exact description of the invention, such as will enable others skilled in the art to which it appertains to make and use the same.

This invention relates to improvements in resilient wheels.

One object of the invention is to provide a wheel having an improved construction of spring tire whereby the wheel will possess all the advantages of a pneumatic tired wheel without having any of the disadvantages of the same.

Another object is to provide a spring tire for vehicle wheels which will be simple, strong, durable and inexpensive in construction, efficient and reliable in operation and well adapted to the purpose for which it is designed.

With the foregoing and other objects in view, the invention consists of certain novel features of construction, combination and arrangement of parts as will be more fully described and particularly pointed out in the appended claims.

In the accompanying drawings: Figure 1 is a side view of a portion of a wheel embodying my invention; Fig. 2 is a vertical longitudinal section of the same; Fig. 3 is a cross sectional view on the line 3—3 of Fig. 1; Fig. 4 is a detail perspective view of one of the sections of the outer jointed rim of the wheel. Fig. 5 is a similar view of one of the tire springs.

Referring more particularly to the drawings, 1 denotes the solid inner rim of the wheel which may be of the usual or any desired construction and 2 denotes the spokes which also may be of any desired construction and which are secured to the wheel rim 1 in any suitable manner. Arranged on the rim 1 is an inner channel shaped metal tire 3.

Arranged around and spaced a suitable distance from the inner tire is an outer rim 4 formed of a series of channel shaped sections 5 which are connected together at their opposite ends by knuckle joints 6 comprising pairs of apertured ears or lugs 7 and 7'. The lugs 7 at one end of each section are spaced from the edges thereof and fit between the lugs 7' of the adjoining ends of the next adjacent sections which lugs 7' are arranged at the sides of the sections with their outer faces flush with the outer faces of said sides and through the alined apertures of said lugs are inserted pivot bolts 8. The outer lugs of one side of each of the rim sections is threaded and with said threaded lugs is engaged the threaded ends of the bolts 8, said ends being screwed through the lugs a sufficient distance to receive lock nuts 9 which are screwed thereon, thus positively holding the bolts from becoming loose.

To the bolts 8 are pivotally connected the outer ends of an annular series of tire springs 10 which are in the form of metal plates bent into the form of a compound curve. On one face of the outer ends of the spring plates 10 are formed apertured cylindrical lugs 11 preferably arranged centrally between the side edges thereof, with the apertures or bores therein extending longitudinally of said lugs and transversely of said springs. These lugs are disposed between the inner pairs of ears or lugs 7 of the rim sections and are pivotally connected to said sections by the pivot bolts 8, said lugs being of a length sufficient to fill the space between the lugs 7. The outer pivoted ends of the springs are of greater width than the main portion thereof to provide flanges 10' at opposite ends of the lugs 11 which project over and bear on the lugs or ears 7 of the rim sections 5 whereby the stress or pressure on the pivot bolts 8 is greatly relieved.

The springs 10 are disposed at a suitable angle and have their inner ends in engagement with and secured to the channel shaped inner tire 3 of the wheel by pairs of substantially U-shaped clips 12 which are engaged with the ends of the springs and have their right angularly formed ends threaded and inserted through the tire 3. With the threaded ends of the clips are engaged clamping nuts 13 which when screwed up into engagement with the inner surface of the tire 3 draw the clips into tight engagement with the ends of the springs 10 thus securely clamping the same against the outer surface of the tire, whereby the springs and the outer rim are securely fastened.

Arranged in the bottom of the sections of the outer jointed rim 4 of the wheel is an annular band 14 of spring metal, preferably brass; which covers the joints or connections of the sections for a purpose hereinafter described.

With the sectional outer rim 4 of the wheel is engaged an outer cushion tire 15 which is preferably formed of rubber or similar material, said tire forming the tread of the wheel. The tire 15 is preferably secured in position in the rim 4 by wire rings or bands 16 arranged therein as shown. By providing the band 14 and arranging the same in the manner described the tire 15 will be prevented from being gripped between the connecting ends of the sections 5 of the outer rim.

From the foregoing description taken in connection with the accompanying drawings, the construction and operation of the invention will be understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a resilient wheel, an inner channeled rim with its flanges extending outwardly, an outer rim spaced from said inner rim and composed of a plurality of segmental sections hingedly connected at their ends, one end of each section having apertured outer lugs at the side edges thereof and the other end having similar inner lugs spaced from the side edges and from each other, said last mentioned lugs being adapted to be arranged between the outer lugs of the adjacent sections, bolts connecting the lugs of said sections, plate springs having cylindrical lugs on one face at one end thereof arranged between said inner lugs and engaged by said bolts, the said springs having flanges extending beyond the opposite ends of the lugs thereof and adapted to overlap and bear on the lugs of the tire sections, and means for connecting the free ends of said springs to the inner rim.

2. In a resilient wheel, an inner rim a channel shaped tire arranged thereon, an outer rim arranged around said inner tire and spaced therefrom, said outer rim comprising a series of channel shaped sections having on their opposite ends, pairs of apertured connecting lugs, pivot bolts adapted to be inserted through said lugs whereby said sections are pivotally connected together, a series of springs arranged between said outer rim and said inner tire, said springs having on one end apertured lugs adapted to receive the pivot bolts of said outer rim sections whereby said springs are pivotally connected to the latter, said pivoted ends of the springs bearing on the connecting lugs of said outer rim sections, U-shaped clips adapted to secure the inner ends of said springs to the channel shaped inner tire of the wheel, an outer tire arranged around said outer channel shaped rim and a spring metal band arranged between said cushion tire and said outer sectional rim whereby the joints of said sections are covered.

In testimony whereof I have hereunto set my hand in presence of two subscribing witnesses.

JOHN VOLLMAN.

Witnesses:
H. C. CASE,
B. M. KITCHINGMAN.